United States Patent [19]

Greatbatch et al.

[11] 3,969,142

[45] July 13, 1976

[54] LITHIUM IODINE BATTERY

[75] Inventors: Wilson Greatbatch, Clarence; Ralph T. Mead, Kenmore; Frank W. Rudolph, Depew; Norbert W. Frenz, North Tonawanda, all of N.Y.

[73] Assignee: Wilson Greatbatch Ltd., Clarence, N.Y.

[22] Filed: Mar. 10, 1975

[21] Appl. No.: 557,101

[52] U.S. Cl. ........................... 136/83 R; 136/100 R; 136/143
[51] Int. Cl.$^2$ ........................................ H01M 43/00
[58] Field of Search ......... 136/6 LN, 6 R, 20, 83 R, 136/100 R, 137, 135 R, 6 A, 6 C, 6 LF, 133

[56] References Cited
UNITED STATES PATENTS

| | | | |
|---|---|---|---|
| 3,078,329 | 2/1963 | Granger | 136/108 |
| 3,347,709 | 10/1967 | Taylor et al. | 136/108 |
| 3,660,163 | 5/1972 | Moser | 136/83 R |
| 3,674,562 | 7/1972 | Schneider et al. | 136/83 R |
| 3,817,791 | 6/1974 | Greatbatch et al. | 136/83 R |

*Primary Examiner*—Anthony Skapars
*Attorney, Agent, or Firm*—Christel & Bean

[57] ABSTRACT

A lithium cell comprising a cathode including a region of iodine-containing material having a pair of operative surfaces and a cathode current collector in the region between the surfaces, a pair of lithium anode elements operatively contacting corresponding cathode surfaces and each having a current collector, and electrical conductors connected to the cathode and anode current collectors. Each anode element is fitted in a holder in a manner exposing a surface of each lithium element to the cathode material and sealing the anode current collector from exposure to the cathode material, the holders being of a material which does not exhibit electronic conduction when exposed to iodine. A pair of separator elements insulate the cathode conductor from the lithium anode elements. A pair of cells electrically connected in series and encapsulated in a single body provide a battery having an output of about 5 volts.

18 Claims, 22 Drawing Figures

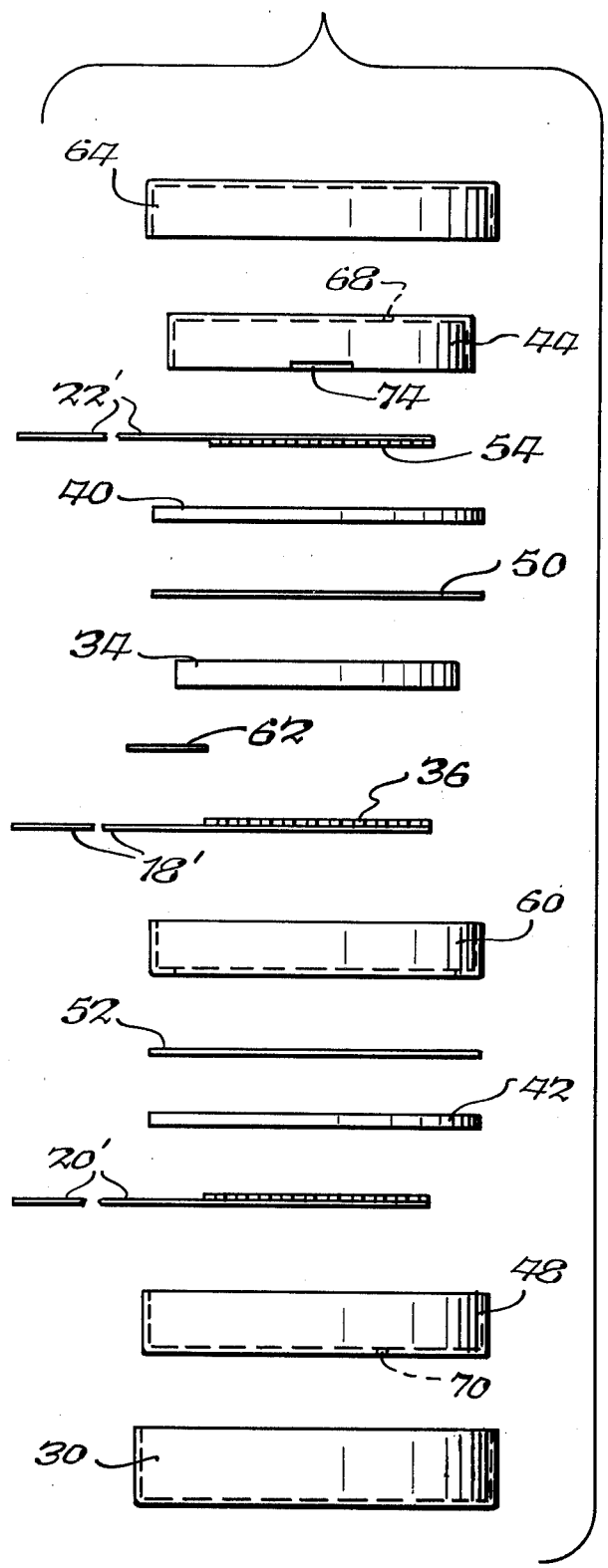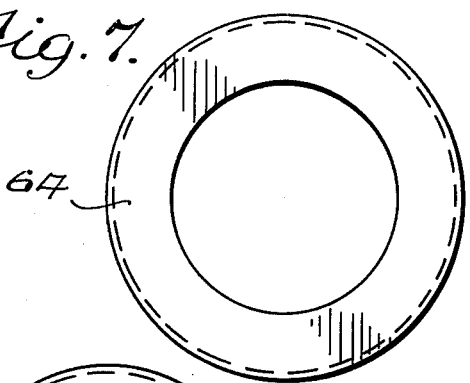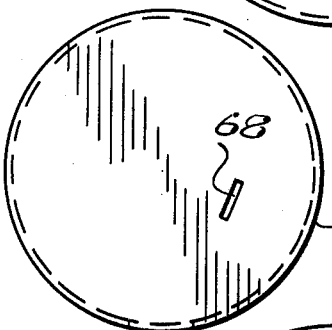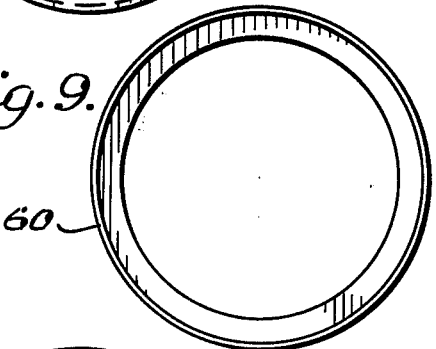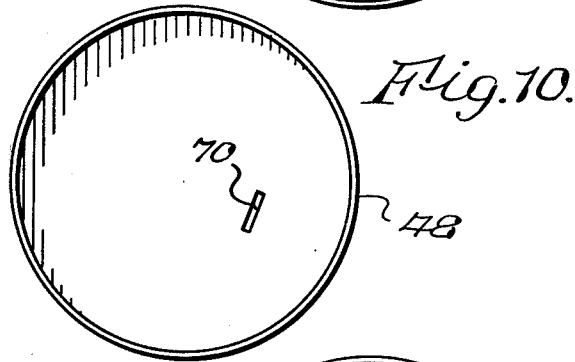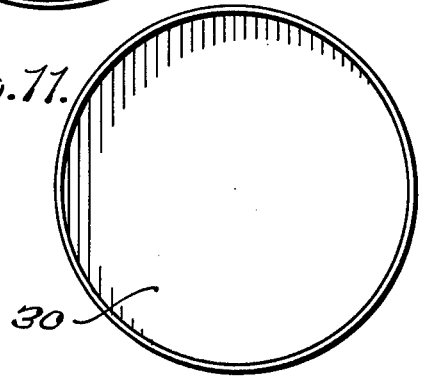

LITHIUM IODINE BATTERY

BACKGROUND OF THE INVENTION

This invention relates to the conversion of chemical energy to electrical energy, and more particularly to a new and improved construction for lithium-iodine cells.

One area of use of the present invention is in providing electrical power safely to inaccessible devices in the human environment, for example to an implanted cardiac pacemaker, although the principles of the invention can be variously applied. Several types of batteries for implantable cardiac pacemakers have been proposed, and recently a lithium-iodine cell has been proposed which advantageously has an open circuit voltage about twice that of the mercury cell, does not generate gas during operation, and has a non-corrosive electrolyte.

A cell has been proposed including a lithium anode and a charge transfer complex of an organic donor component and iodine. When more than one cell is needed for certain voltage requirements, providing such a battery for human implantation gives rise to size and capacity requirements. In particular, such a battery must be relatively small in size to be suitable for implantation while at the same time having a relatively larger lithium area to give a larger voltage output. Along with these requirements, each cell should be constructed in a manner preventing an internal electrical short circuit arising from migration or flow of the iodine-containing cathode material.

SUMMARY OF THE INVENTION

It is, therefore, an object of this invention to provide a new and improved construction for a lithium-iodine cell.

It is a further object of this invention to provide a new and improved construction for a lithium-iodine battery including a plurality of cells.

It is a more particular object of this invention to provide a lithium-iodine cell construction having a relatively larger lithium area therein and relatively small overall outer size.

It is a further object of this invention to provide such a cell construction which also constrains migration of the iodine material thereby avoiding an internal electrical short circuit in the cell.

It is a further object of this invention to provide such a cell and battery construction which can be manufactured relatively easily and economically.

The present invention provides a lithium-iodine cell comprising a region of iodine-containing cathode material having at least two surface portions and a current collector element in the material spaced from the surface portions and first and second lithium anode elements operatively contacting corresponding ones of the cathode surfaces. Each lithium anode element is embraced by a holder in a manner exposing a surface of each element to the cathode material and sealing the corresponding anode current collector element from exposure to the cathode material, the holders being of a material which does not exhibit electronic conduction when exposed to iodine. Electrical conductors are operatively connected to the anode and cathode current collectors, and the cathode conductor is insulated from the lithium anode elements. A pair of cells electrically connected in series and encapsulated in a body provides a battery having an output of about 5 volts.

The foregoing and additional advantages and characterizing features of the present invention will become clearly apparent from a reading of the ensuing detailed description together with the included drawing wherein:

BRIEF DESCRIPTION OF THE DRAWING FIGURES

FIG. 6 is a developed view illustrating the construction of the lithium-iodine cell of the present invention;

FIG. 7 is a plan view of the anode sealing ring shown in FIG. 6;

FIG. 8 is a plan view of the first anode holder shown in FIG. 6;

FIG. 9 is a plan view of the separator shown in FIG. 6;

FIG. 10 is a plan view of the second anode holder shown in FIG. 6;

FIG. 11 is a plan view of the separatory cup shown in FIG. 6;

DETAILED DESCRIPTION OF THE ILLUSTRATED EMBODIMENT

Figure 1:
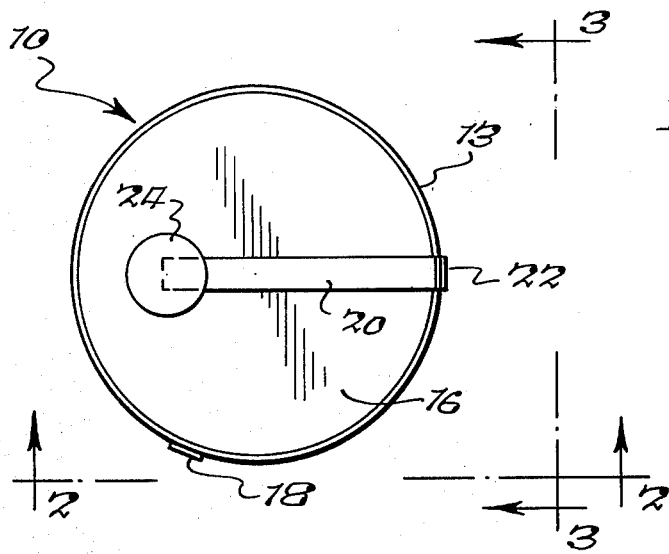
FIG. 1 is a plan view of a lithium-iodine cell according to the present invention.
Figure 2:
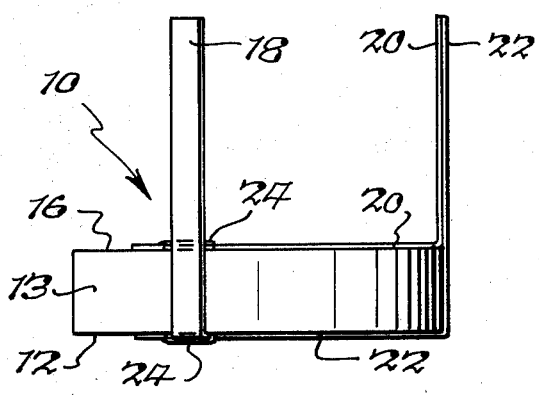
FIG. 2 is a side elevational view taken about on line 2—2 in FIG. 1.
Figure 3:
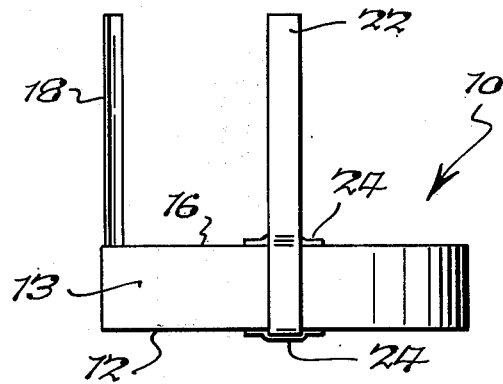
FIG. 3 is a side elevational view taken about on line 3—3 in FIG. 1.

FIGS. 1–3 illustrate a lithium iodine cell 10 constructed according to the present invention. The cell components are contained within a housing or cover comprising a first generally cup-shaped portion 13 having a planar base portion and a rim portion extending therefrom. Another housing or cover portion 16 is received within the first portion in a manner which will be described in detail presently. In the present illustration, the housing portions are circular, each including disc-shaped base portions and an annular rim or flange portion extending therefrom, but other shapes such as rectangular can be employed. The cell has a cathode and two anodes operatively associated therewith, and these and other elements of the cell will be described in detail further on in the specification. Cell 10 is provided with a single cathode conductor or lead 18 joined at one end to a cathode current collector within the cell, as will be described, and extending therefrom through the cell cover portions so as to be externally available for making an electrical connection thereto. Cell 10 further comprises a pair of anode conductors or leads 20 and 22, each of which is joined at one end thereof to a corresponding anode current collector within the cell 10 and each of which extends therefrom outwardly through the housing. In particular, the cathode leads 20 and 22 extend out through apertures in opposite end faces of cell 10 and radially along the corresponding faces whereupon one of the leads, i.e. lead 22, extends longitudinally along the rim portion between the end faces whereupon it meets lead 20 and both leads are joined together in a manner providing a common extending lead for making electrical connection thereto. The slots or apertures provided in the corresponding end faces of the housing through which leads 20, 22 extend are sealed by seal or patch elements 24 in a manner which will be described in detail presently.

Figure 4:
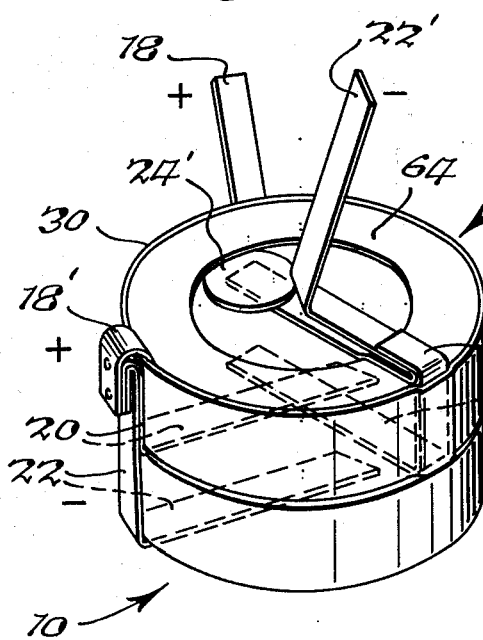
FIG. 4 is a perspective view of a lithium-iodine battery including two cells according to the present invention.
Figure 5:
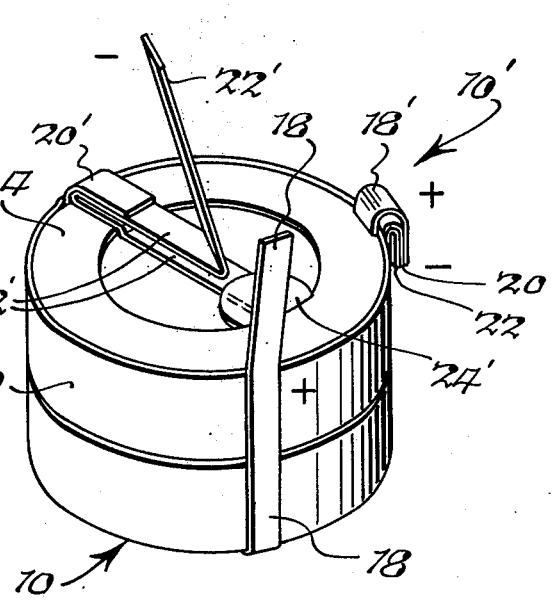
FIG. 5 is a perspective view of the lithium-iodine battery of FIG. 4 rotated about 180°.
Figure 12:
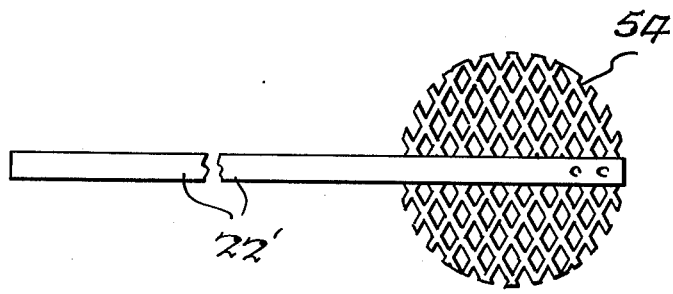
FIG. 12 is a plan view of a current collector and lead sub-assembly, for example an anode current collector and lead, of the cell construction of FIG. 6.
Figure 13:
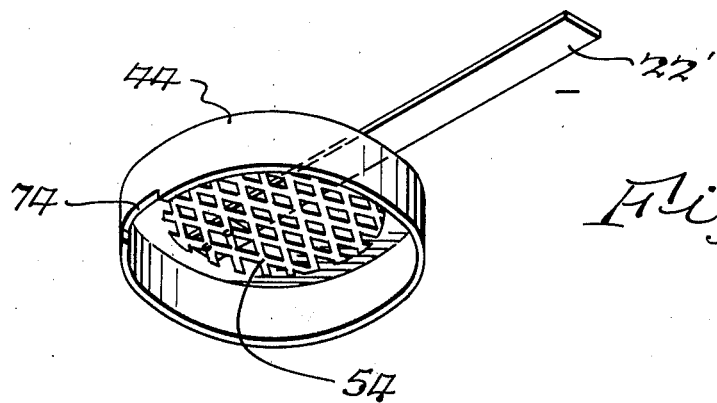
FIG. 13 is a perspective view of the first anode holder and current collector and lead subassembly of the cell construction of FIG. 6.
Figure 14:
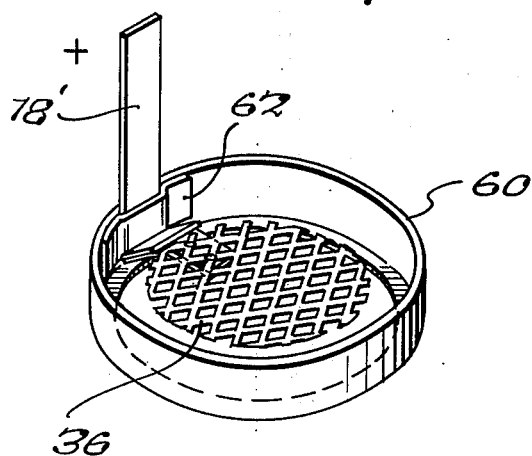
FIG. 14 is a perspective view of the separator and cathode current collector and lead subassembly of the cell construction of FIG. 6.
Figure 15:
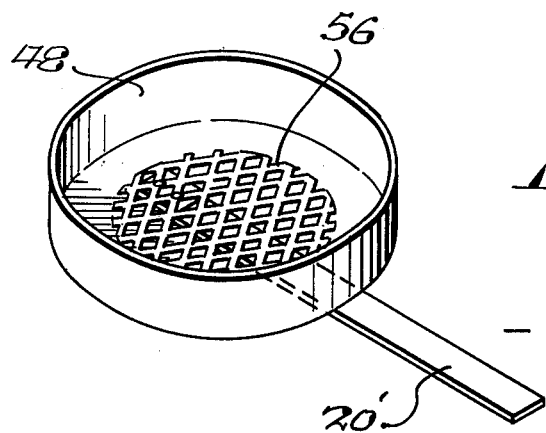
FIG. 15 is a perspective view of the second anode holder and current collector and lead subassembly of the cell construction of FIG. 6.

FIGS. 4 and 5 illustrate a battery according to the present invention comprising the combination of two cells identical to the cells shown in FIGS. 1–3 and connected electrically in series. The identical elements of the two cells are designated with identical reference numerals, the numerals applied to one cell having a prime superscript. In making the series electrical combination, the joined anode leads of one cell are connected to the cathode lead of the other cell, and an external load or circuit is connected to the battery combination through the remaining cathode lead and the remaining joined pair of anode leads. In particular, the cells 10 and 10' are combined in face-to-face and inverted relation wherein the faces of the cells 10, 10' which are in adjacent or abutting relation are the faces opposite the face of the particular cell from which the corresponding cathode lead 18, 18' exits or extends. In other words, in the arrangement of FIGS. 4 and 5, cathode leads 18 and 18' are exposed at the outer opposite end faces of the arrangement. The joined anode leads 20, 22 of cell 10 extend along the rim portion of cell 10' in a direction generally parallel to the longitudinal axis of the assembly. The anode leads 20, 22 meet and are joined to the cathode lead 18' of cell 10' and the combination of the three leads preferably is bent around and back as shown in FIG. 4. The joined portion of anode leads 20', 22' of cell 10' extends for a short distance along the exposed face of cell 10', whereupon only the single lead 22' extends further along and outwardly for making electrical connection thereto. The single cathode lead 18 of cell 10 extends along the rim portions of both cells 10 and 10' in a direction generally parallel to longitudinal axis of the combination whereupon it extends outwardly from the same end face of the arrangement as lead 22' for making an external electrical connection thereto. Cell 10' of the combination in FIGS. 4 and 5 is fitted within a separating element 30 which is cup-shaped having a disc-like base and an annular rim. The base of separatory cup 30 abuts against cell 10 in the combination shown in FIGS. 4 and 5, and the marginal or peripheral edge of the rim portion is generally flush with the exposed face of cell 10'. The detailed construction of one of the cells, for example 10', now will be described.

Figure 16:
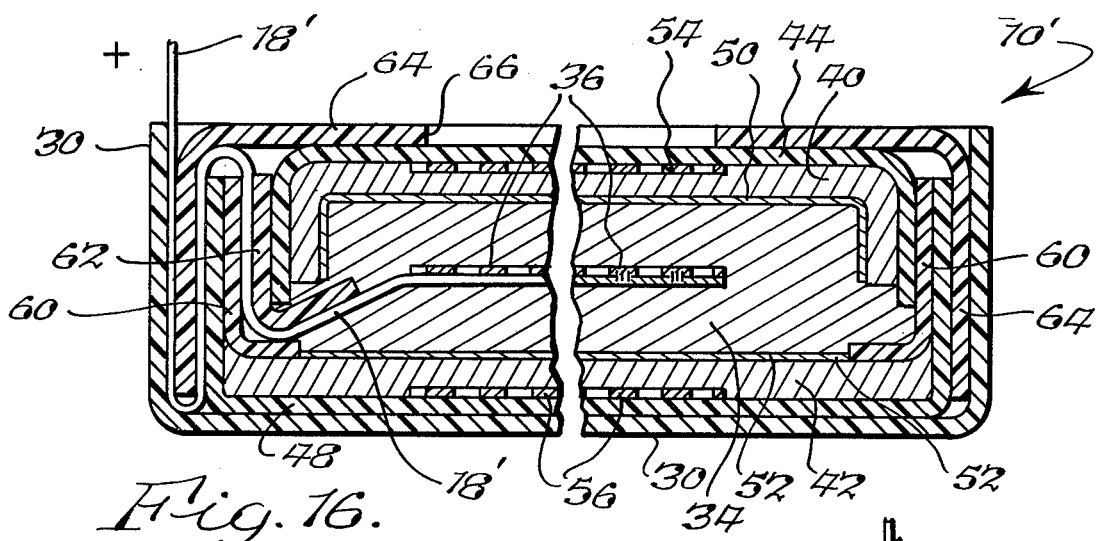
FIG. 16 is a sectional view taken about on a line indicated by the positive lead of a cell according to the present invention.
Figure 17:
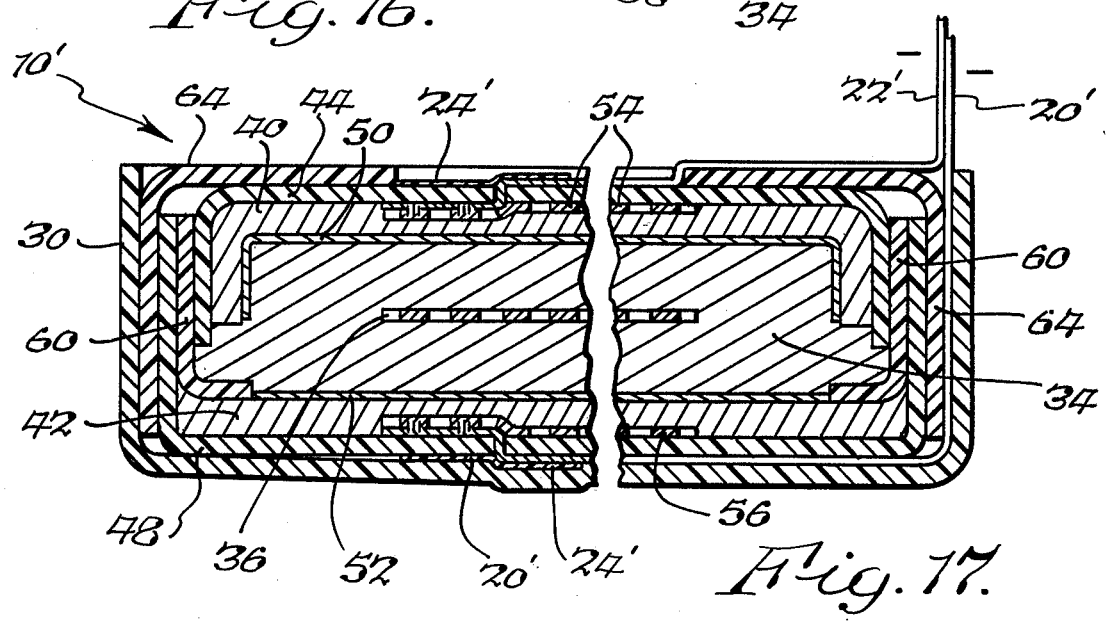
FIG. 17 is a sectional view taken about on a line indicated by the negative lead of a cell according to the present invention.

Referring now to FIGS. 16 and 17, the lithium-iodine cell according to the present invention comprises cathode means comprising a charge transfer complex of an organic donor component material and iodine. A preferred method of making material 34 and combining it with the other elements of the cell will be described in detail further on in the specification. The cathode material 34 is of a shape having at least two surface portions, in particular the spaced apart upper and lower oppositely directed surface portions as viewed in FIGS. 16 and 17. A current collector element 36 is located in the cathode material 34 spaced from the surface portions, in particularly being disposed substantially parallel to and equi-distant from the upper and lower surface portions. Collector 36 preferably is of No. 12 mesh platinum metal annealed, and cathode lead 18' preferably is a strip of platinum metal to facilitate bending. Lead 18' is bonded or welded at one end to cathode collector 36 and extends from the material 34 and through the remaining components of the cell in a manner to be described whereupon it exits or extends from the cell 10' so as to be externally available for making an electrical connection thereto.

The cell of the present connection further comprises a first lithium anode element 40 operatively contacting one of the surface portions of cathode material 34, in the present illustration the upper surface thereof as viewed in FIGS. 16 and 17, and a second lithium anode element 42 operatively contacting the other surface portion of cathode material 34, i.e. the lower portion thereof as viewed in FIGS. 16 and 17. Each of the lithium anode elements 40, 42 has a generally planar portion including oppositely-directed surfaces, and one of the opposite surfaces of each of the elements operatively contacts the cathode material 34. In the present illustration the elements 40, 42 are disc-shaped but other shapes such as rectangular can be used. A first anode holder 44 embraces the lithium anode element 40 in a manner exposing the one surface of the lithium element to the cathode material 34 and contacting the other surface of lithium anode element. Holder 44 is generally cup-shaped having a disc-shaped base portion which is generally planar and an annular rim portion extending therefrom at about a right angle thereto. Lithium anode element 40 is formed into holder 44 in a manner conforming generally to the inner shape thereof, and the marginal or peripheral edge of element 40 is recessed slightly inwardly of the marginal or peripheral edge of holder 44.

A second anode holder 48 embraces lithium anode element 42 in a manner exposing the one surface of lithium element 42 to the cathode material 34 and contacting another surface thereof. Holder 48 also is generally cup-shaped having a disc-shaped base portion and an annular rim portion extending therefrom at about a right angle thereto, but the perimeter of holder 48 is greater than that of holder 44 and the longitudinal length of the rim portion of holder 44. Lithium anode element 42 is formed in holder 48 in a manner contacting the inner surface of the base portion and remaining generally planar.

The cell is assembled in a manner such that a portion of the rim of the anode holder 44 is received within the rim of anode holder 48. Anode holders 44 and 48 both are of a material which does not exhibit electronic conduction when exposed to iodine. One material found to satisfy this requirement is a fluoropolymer material available commerically from the Allied Chemical Company under the trademark Halar. In addition, each of the lithium anode elements 40 and 42 have a coating 50 and 52, respectively, on the surfaces thereof operatively associated with cathode material 34. The coatings 50 and 52 are of an organic electron donor component material, for example polyvinyl pyridyne. A preferred method of forming the lithium anode elements into the corresponding holders and providing the coatings thereon will be described in detail presently.

The cell of the present invention further comprises anode electrical conductor means operatively connected to the lithium anode elements 40 and 42. In particular, a first anode current collector element 54 is positioned between lithium element 40 and the inner surface of the base portion of holder 44 as shown in FIG. 17, being in firm contact with the lithium element. One end of anode lead 22' is joined as by welding to current collector 54, and lead 22' extends therefrom through an aperture provided in the base portion of holder 44 whereby it lies along an end face of the cell for joining with the other anode lead as previously described. Seal or path 24' as shown in FIG. 17 is placed over the portion of the outer surface of holder 44 around the aperture and over the corresponding portion of lead 22', being secured thereto by a suitable cement. Seal element 24' preferably is of a fluoropolymer material commercially available from the Dupont Co. under the trademark Tefzel, and a preferred form of cement is a fast-setting type which prevents migration of iodine therethrough such as a cyanoacrylate cement commercially available from Techni-Tool, Inc. under the designation Perma-bond 101. Similarly, a current collector 56 is positioned between lithium element 42 and the inner surface of holder 48, being in firm contact with the lithium element. One end of lead 20' is secured to collector 56 such as by welding, and lead 20' extends through an aperture provided in the base portion of holder 48 and extends along the end face of the cell and then along the rim thereof whereupon it joins the other anode lead 20' as previously described. Sealing element 24' is positioned over the aperture and adjacent portion of holder 48 and lead 20', seal 24' preferably also being of Tefzel material and secured by the same type of cyanoacrylate cement. Anode current collectors 54, 56 preferably are of no. 12 mesh zirconium metal annealed, and anode leads 20', 22' are thin strips of zirconium metal.

The cell of the present invention further comprises separator means for insulating the cathode conductor from the lithium anode elements. The separator means is located between the rim portions of the anode holders 44 and 48 and receives cathode lead 18' in a manner insulating it from the lithium anode elements 40, 42. In particular, the separator means comprises a first separator element 60 of hollow and continous shape, in the present instance an annular ring having a base portion and an inwardly directed radial flange disposed at about a right angle to the base portion. The outer surface of the radial flange portion abuts the surface of lithium element 42 adjacent the outer periphery or margin of the surface, and the outer surface of the rim portion of separator element 60 abuts the inner rim surface of anode holder 48. As shown in FIG. 16, cathode lead 18' extends from current collector 36 through the cathode material 34 and then along the inner surface of element 60 to exit from the assembly. The radial flange of separator 60 is of sufficient radial dimension to protect or otherwise insulate lead 18' from lithium element 42. The separator means comprises a second separator element 62 having first and second body portions disposed at an angle to each other, in the present instance an acute angle. Separator element 62 is positioned with one of the body portions disposed between cathode lead 18' and the outer surface of the rim portion of anode holder 44, and the other body portion extends inwardly therefrom into cathode material 34 and along a portion of lead 18'. This body portion is of sufficient width and length to protect or otherwise insulate cathode lead 18' from the lithium anode element 40.

The cell of FIGS. 16 and 17 is fitted within a cup-shaped housing 64 or sealing cup having a generally planar base portion and annular rim portion extending therefrom. In the present illustration the outer surface of anode holder 44 is fitted against the inner surface of the base of cup 64, and a central opening 66 provided in the base allows anode lead 22' to extend outwardly therefrom as shown in FIG. 17. The rim portion of the housing 64 is of sufficient longitudinal length to extend along substantially the entire length of the cell assembly. Cathode lead 18' extends along and between the separator elements 60 and 62 and then is disposed in a return bend so as to be located between the outer rim surface of anode holder 48 and the inner rim surface of cup 64 whereupon it again extends back along the outer surface of the rim of cup 64. The assembly then is fitted into the separating cup 30 previously described in a relatively snug fitting relationship and with leads 18', 20' and 22' extending therefrom for making electrical connection thereto.

The lithium-iodine cell of the present invention is formed and assembled in the following manner. The anode assemblies are formed first, and turning to the one including lithium element 40, lead 22' is welded or otherwise bonded at one end to current collector 54 and the other end of the lead is drawn through an aperture 68 provided in the base or central portion of holder 44 until current collector 54 is drawn tightly against the inner surface of the central portion of holder 44. Then a lithium element, in the present instance generally disc-shaped, is placed within holder 44 and the combination placed in a mold or other suitable holding fixture and then pressure is applied to the exposed face of the lithium element in a manner forming or extruding it along the inner surface of the rim portion of holder 44 to form the lithium element 40 to the conforming cup shape as shown in FIGS. 16 and 17. The shape is of course controlled by the original dimensions of the element and the amount of pressure applied, and in the present instance it is preferred that the peripheral or marginal surface of element 40 terminate slightly inwardly of the corresponding peripheral rim of holder 44. The material of holder 44 is pressure bondable to lithium and by virtue of the pressure forming operation, the inner surface of the lithium element is bonded or sealed to the inner surface of holder 44 in a manner sealing current collector 54 therein and protecting it against migration of any of the iodine-containing material. Seal or patch 24' can be secured to the other surface of holder 44 and lead 22' at the completion of this forming application or at a later stage in the cell assembly if desired.

In a similar manner, lead 20', one end of which is welded or otherwise bonded to collector 56, is drawn through an aperture 70 provided in the base portion of holder 48 until collector 56 is drawn tightly against the surface of the holder 48. Then a disc-shaped lithium element is placed in holder 48 against current collector 56 and the inner surface of the base portion whereupon holder 48 containing the lithium element is placed within a mold or suitable holding fixture and then pressure is applied to the outer face of the lithium element. In forming this element, however, only enough pressure is applied to seal the surfaces of the lithium element to the corresponding surfaces of holder 48 and the lithium element is not formed into a cup shape as compared to foregoing procedure. As a result, current collector element 56 is likewise sealed between lithium element 42 and the surfaces of holder 48 in a manner preventing migration of any of the iodine-containing cathode material to current collector 56. Seal or patch 24' can be secured to the outer surface of holder 48 and lead 20' either at the completion of this forming operation or at a later stage in the cell assembly if desired.

Cathode rim 60 is placed over and onto anode holder 44 as shown in FIGS. 16 and 17 with the inwardly-directed radial flange thereof adjacent the edge of holder 44 and with cathode lead 18 and separator element 62 fitting into an alignment notch or recess 74 provided in the edge of holder 44 as shown in FIG. 6. The inner diameter of cathode rim 60 is approximately equal to the outer diameter of holder 44 so that the two parts fit in a relatively snug relation, being secured together by suitable cement such as the aforementioned cyanoacrylate cement Permabond 101. Anode holder 48 is placed over and onto cathode ring 60 with the inwardly directed radial flange thereof contacting the marginal or peripheral portion of lithium element 42 as shown in FIGS. 16 and 17. The outer perimeter of cathode rim 60 is approximately equal to the inner perimeter of holder 48 so that the two parts fit in a relatively snug relation, being secured by the aforementioned cement. As shown in FIGS. 16 and 17, the end faces of holder 48 and cathode ring 60 are substantially flush or coplanar.

The surfaces of the lithium anode elements 40 and 42 adapted to be operatively associated with the cathode in the battery are provided with coatings 50 and 52, respectively, of an organic donor component material. In particular, the material in each coating is an organic electron donor material of the group of organic compounds known as charge transfer complex donors. The material of the coatings can be the organic donor used in preparing the charge transfer complex of the cathode material, but other materials can be employed. A preferred material for each coating is polyvinyl pyridine and it is applied to the exposed surface of each lithium element 40 and 42 in the following manner. A solution of two-vinyl pyridine polymer in anhydrous benzene or other suitable solvent is prepared. The two-vinyl pyridine is readily commercially available. The solution is prepared with two-vinyl pyridine present in the range from about 10% to about 20% by weight with a strength of about 14% by weight of two-vinyl pyridine being preferred. While two-vinyl pyridine, four-vinyl pyridine and three-ethyl two-vinyl pyridine can be used, two-vinyl pyridine is preferred because of its more fluid characteristics. When the solution is prepared at a strength below about 10% the resulting coating can be undesirably too thin, and when the solution is prepared at a strength greater than about 20% the material becomes difficult to apply. The solution is applied to the exposed surface of each lithium plate in a suitable manner, for example simply by application with a brush. The presence of the anhydrous benzene serves to exclude moisture thereby preventing any adverse reaction with the lithium plate. The coating anode then is exposed to a desiccant in a manner sufficient to remove the benzene from the coating. In particular, the coated anode is placed in a chamber with barium oxide solid material for a time sufficient to remove the benzene, which can be in the neighborhood of 24 hours.

The cathode material 34 comprises a charge transfer complex of an organic material and iodine. The organic material should be an electron donor and can be any organic compound having a double bond or an amine group. An electron donor gives the iodine sufficient conductivity for proper cell operation. A preferred organic material is two-vinyl pyridine polymer. The cathode material 34 is prepared by heating the organic material, i.e. two-vinyl pyridine, mixed with iodine, to a temperature greater than the crystallization temperature of iodine. The amount of iodine should be greater than about 50% by weight of the resulting mixture so that enough iodine is available in the cathode material 34 to provide sufficient conductivity for proper cell operation.

The resulting mixture is a viscous, flowable substance which is combined with the anodes to form the cell in the following manner. The sub-assembly comprising anode holder 44, coated lithium element 40, separator elements 60, 62 and cathode current collector 36 and lead 18 is supported or otherwise held in an upright position which is inverted relative to the position of FIGS. 16 and 17 whereupon the material 34 is poured therein up to a level flush with the rim or inward flange of element 60. Then anode holder 48 containing lithium anode element 42 (being inverted relative to the position shown in FIGS. 16 and 17) is fitted over and onto separator element 60 in rotational alignment so that lead 20' is aligned with lead 22' and moved downwardly thereon so that cathode material 34 contacts the coated surface of lithium element 42. Anode holder 48 can be secured to separator 60 by the aforementioned cyanoacrylate cement, and in the present illustration the outer surface of the base portion of anode holder 44 is disposed slightly outwardly relative to the plane of the edges of separator 60 and holder 48. The completed assembly is fitted in housing 64 and the resulting assembly fitted in cup 30 as previously described and shown in FIGS. 16 and 17, the parts being held or fixed together by the aforementioned cyanoacrylate cement. The foregoing is illustrated further by the developed view of FIG. 6 and the parts and subassemblies thereof shown in FIGS. 7–15.

The lithium-iodine cell according to the present invention operates in the following manner. As soon as the iodine-containing cathode material 34 operatively contacts lithium elements 40 and 42, a lithium-iodine electrolyte begins to form at each interface between material 34 and elements 40, 42 and electrical potential differences exist between cathode lead 18' and each anode lead 20', 22'. The exact mechanism by which the iodine-containing cathode material 34 and each lithium plate 40 and 42 come into operative contact through coatings 50 and 52, respectively, is not known. The mechanism could involve migration of iodine atoms from material 34 through the coatings 50, 52 to the plates 40, 42 or migration of lithium atoms from plates 40, 42 through coatings 50, 52 to material 34. Cell 10 of the battery combination illustrated in FIGS. 4 and 5 is identical in construction and operation to cell 10'.

The coatings 50 and 52 on lithium elements 40 and 42, respectively, perform several important functions. One is a desirable reduction in cell impedance believed to result from a better and improved electrically effective contact area between the cathode material and each lithium anode element. In particular, when iodine-containing cathode material at an elevated temperature comes into contact with an uncoated lithium surface, there can be some immediate recrystallization of iodine on the lithium surface thereby blocking or preventing operative contact at that point between the lithium element and the complex of organic material and iodine. Coatings 50 and 52 serve as protective coatings to prevent this problem, functioning as buffers between the pure lithium plates and the relatively hot cathode material as it contacts the plates. There may be other mechanisms involved in the improvement of performance resulting from the use of this coating. As a result, there is provided a greater utilization of the surface of each anode lithium element by the cathode material. In addition, the protective coatings 50, 52 permit a relatively longer handling time during construction of the cell prior to introducing the hot cathode material. Also, during assembly of the cell a cement is used, such as the aforementioned cyanoacrylate cement, which is an iodine inhibitor, and the prior application of coatings 50, 52 to the lithium anode operative surfaces protects those surfaces from exposure to the cement.

The seal elements 24, 24' are initially bonded by pressure in place against the outer surface of the particular anode holder and lead as previously described. After this, a cement which does not transmit appreciable quantities of iodine and is a non conductor when iodine is absorbed, such as the aforementioned cyanoacrylate Permabond 101 cement, is applied over the seal or patches 24, 24'. This provides an effective gas-tight seal which is not broken by flexing or movement of the anode lead in the aperture of the holder. The provision of separating cup 30, which in the battery combination shown in FIGS. 4 and 5 receives cell 10', provides an effective isolation of the two cells 10, 10' which are in face-to-face relation with selected ones of the electrical leads joined together as previously described. In other words, separating cup 30 permits the close physical arrangement of the cells thereby providing an assembly of relatively small overall size while at the same time preventing any undesired electrical or chemical coupling between the cells. Cup 30, as well as separator elements 60, 62 and sealing cup 64 are of a material which does not exhibit electronic conduction when exposed to iodine, for example the aforementioned Halar material.

Figure 18:
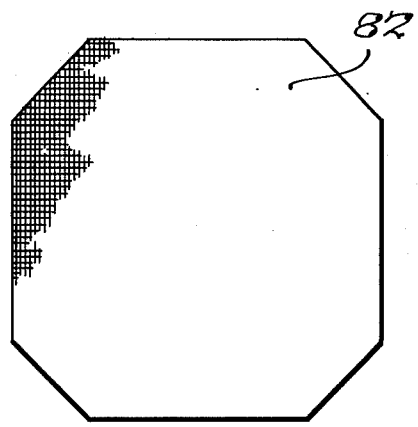
FIG. 18 is a plan view of a sheet element forming part of a sealed housing for the battery of the present invention.
Figure 19:
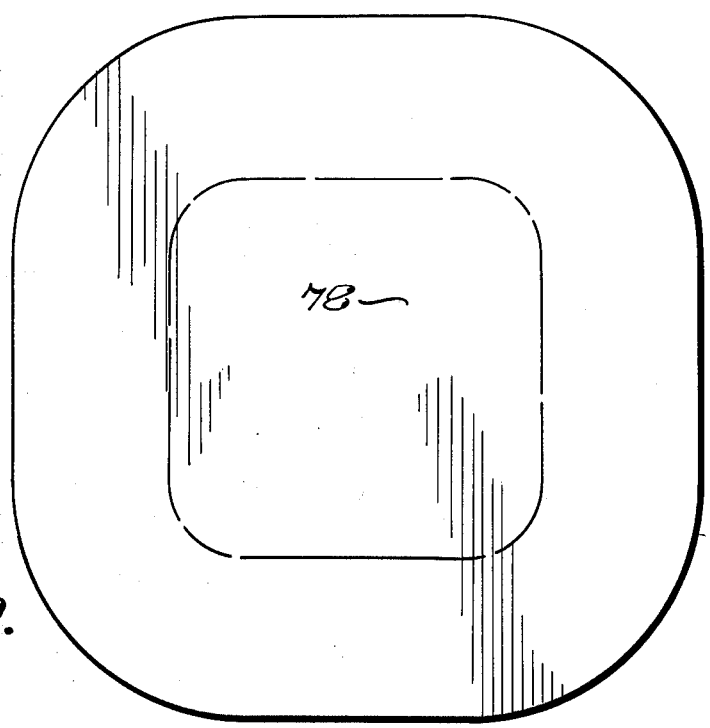
FIG. 19 is a plan view of a sheet element forming another part of a sealed housing for the battery of the present invention.
Figure 20:
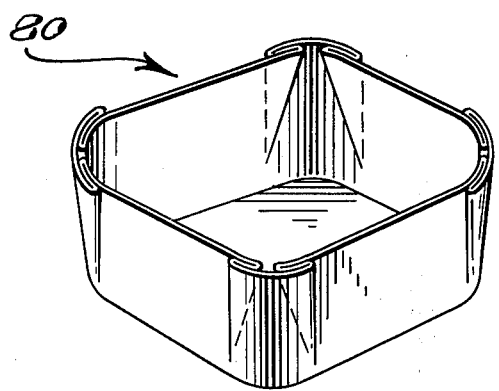
FIG. 20 is a perspective view of a container formed from the element of FIG. 19.
Figure 21:
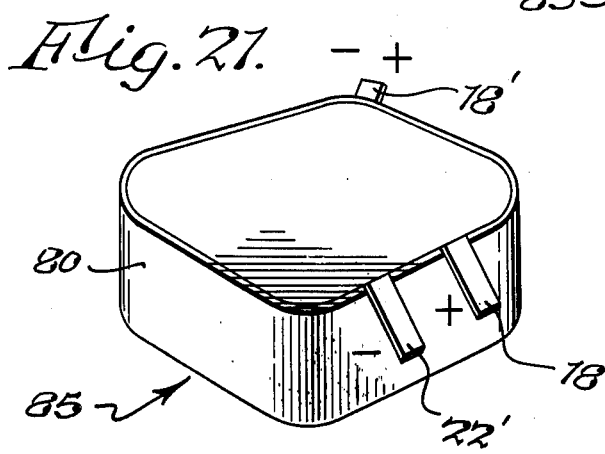
FIG. 21 is a perspective view of a battery comprising two cells encapsulated in the container of FIG. 20 according to the present invention.
Figure 22:
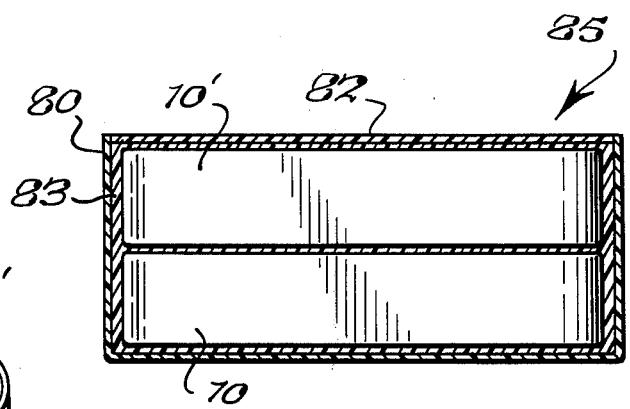
FIG. 22 is a cross sectional view of the battery of FIG. 21 and showing the cells thereof in elevation.

The battery of the present invention including the combination of cells 10, 10' as shown in FIGS. 4 and 5 is encapsulated in potting material in the following manner. A sheet 78 of thin plastic material, for example the aforementioned Halar material, is cut to the shape shown in FIG. 19 and then formed into a cup-shaped container 80 as shown in FIG. 20. This can be done by combined application of heat and pressure according to conventional plastic forming techniques. Then potting material of the type which does not exhibit electronic conduction when exposed to iodine, for example a suitable polyester commercially available from the Durez Division of the Hooker Chemical Company under the designation Hetron 32A, is introduced to cup 80 and the battery placed thereon. Cup 80 is of dimensions such that the battery fits somewhat closely therein, with the potting material occupying the space between the battery and the inner surfaces of cup 80, and with the end surface of the battery recessed below the edge of the open end of cup 80. Then a sheet element 82 of fiberglass material shown in FIG. 18 is placed in the open end of cup 80 over the battery to serve as an insulator, and is secured therein upon curing of the polyester material 83, this generally being done at room temperature. An encapsulated battery 85 in completed form is shown in FIGS. 21 and 22. The encapsulated battery of FIGS. 21 and 22 which delivers an output of about five volts preferably is placed in a metal casing (not shown) which is hermetically sealed.

By way of example, typically the encapsulated battery shown in FIGS. 21 and 22 has a width and length each of about 1.245 inches and a height of about 0.625 inch. Each cell 10, 10' as shown in FIGS. 1–3 has a diameter of 1.20 inches and an axial height or length of 0.250 inch.

It is therefore apparent that the present invention accomplishes its intended objects. The arrangement of lithium elements operatively associated with the oppositely directed surfaces of the region of iodine-containing cathode material provides a cell and a battery combination which is relatively small in overall size while at the same time having a relatively large lithium area to give a relatively greater current capability under load conditions. The anode holders of material which is non-reactive with iodine and the separators for insulating the cathode conductor from the lithium elements are of a construction which is consistent with the foregoing objectives while at the same time constraining iodine migration and preventing internal electrical short circuits. The coatings on the lithium anode elements enchance the cell operation as well as contributing to efficiency in assembly thereof. The cells are combined to provide a battery in a manner satisfying the objectives of relatively small overall size and relatively larger voltage output, the relatively greater lithium anode area of the cells providing a relatively greater current capability under load conditions. While a single embodiment of the present invention has been described in detail, this if for the purpose of illustration, not limitation.

We claim:
1. A lithium-iodine cell comprising:
   a. cathode means comprising a region of iodine-containing material having at least two surface portions and a current collector element in said material spaced from said surface portions;

b. cathode electrical conductor means operatively connected to said current collector element and extending from said cathode material;

c. first and second lithium anode elements, each of said lithium anode elements having a generally planar portion including opposite surfaces, one of the opposite surfaces of each of said elements operatively contacting said cathode material;

d. first and second anode holders embracing said first and second lithium anode elements, respectively, in a manner exposing the one surface of said first and second lithium element, respectively, to said cathode material, each of said holders being generally cup-shaped having a base portion and a rim portion, the other surface of each lithium element facing said base portion, said first holder having a perimeter smaller than the perimeter of said second holder, a portion of the rim of said first holder being received within the rim of the second holder;

e. said cathode material being contained within said holders and said cathode electrical conductor means extending between said rims of said holders and outwardly therefrom;

f. separator means of insulating material between said rims of said holders and embracing a portion of said cathode electrical conductor means for insulating said cathode conductor from said lithium anode elements; and g. anode electrical conductor means operatively connected to said lithium anode elements.

2. Apparatus according to claim 1, wherein said iodine-containing cathode material comprises a charge transfer complex of an organic donor component and iodine.

3. Apparatus according to claim 1, wherein each of said lithium anode elements has a coating thereon and operatively associated with said cathode means, said coatings being of an organic electron donor component material.

4. Apparatus according to claim 1, wherein said first and second anode holders contact the other surfaces of said first and second lithium anode elements, respectively.

5. Apparatus according to claim 1, wherein each of said first and second anode holders is of a material which does not exhibit electronic conduction when exposed to iodine.

6. Apparatus according to claim 5, wherein each of said first and second anode holders is of a fluoropolymer material.

7. Apparatus according to claim 1, wherein said anode electrical conductor means comprises first and second current collector elements operatively contacting the other surfaces of said first and second lithium anode elements, respectively, and electrical conductor means connecting said current collectors together and extending from said cell for making electrical connection thereto.

8. Apparatus according to claim 1, wherein said separator means comprises an annular element positioned in said second holder adjacent said rim portion and having a portion between said cathode lead and said second lithium element and an element having a first body portion fixed to said first holder and a second body portion between said first lithium element and said cathode lead.

9. A lithium-iodine cell as defined in claim 1, in combination with another identical lithium-iodine cell, the two cells being connected electrically in series to provide a battery delivering about twice the voltage of a single cell.

10. The combination according to claim 9, wherein said cells are arranged in end-to-end substantially abutting relation and further including separator means between the adjacent ends of said cells.

11. The combination according to claim 10, wherein said separator means comprises a generally cup-shaped container adapted to receive one of said cells, the other cell being positioned against an outer surface of said cup.

12. The combination according to claim 9, further including a container for housing said battery and potting material in said container encapsulating said battery, said potting material being nonconductive in the presence of iodine.

13. A lithium-iodine cell comprising:

a. cathode means comprising a region of iodine-containing cathode material having at least two surface portions and a current collector element in said material spaced from said surface portions;

b. cathode electrical conductor means operatively connected to said current collector element and extending from said cathode material;

c. first and second lithium anode elements, each of said lithium anode elements having a generally planar portion includingn opposite surfaces, one of the opposite surfaces of each of said elements operatively contacting said cathode material;

d. first and second anode holders embracing said first and second lithium anode elements, respectively, in a manner exposing the one surface of said first and second lithium element, respectively, to said cathode material, a portion of one of said anode holders is received within a portion of the other of said holders;

e. a pair of separator elements of insulating material between said holders for insulating said cathode conductor from said lithium anode elements;

f. a first generally cup-shaped housing receiving said cathode material, anode elements and holders;

g. a second generally cup-shaped housing receiving said cathode material, anode elements and holders and said first cup-shaped housing, said first and second housing being in inverted relation; and h. anode electrical conductor means operatively connected to said lithium anode elements.

14. Apparatus according to claim 13 wherein said cathode conductor extends between said separator elements, between one of said anode holders and said first housing and between said first and second housing in a manner defining a compound bend and then extends outwardly from said cell for making an electrical connection thereto.

15. A lithium-iodine cell as defined in claim 13, in combination with another identical lithium-iodine cell, the two cells being connected electrically in series to provide a battery delivering about twice the voltage of a single cell.

16. The combination according to claim 15, wherein said cells are arranged in end-to-end substantially abutting relation and further including separator means between the adjacent ends of said cells.

17. The combination according to claim 16, wherein said separator means comprises a generally cup-shaped container adapted to receive one of said cells, the other cell being positioned against an outer surface of said cup.

18. The combination according to claim 15, further including a container for housing said battery and potting material in said container encapsulating said battery, said potting material being nonconductive in the presence of iodine.

* * * * *